(12) United States Patent
Kanata et al.

(10) Patent No.: US 6,750,984 B1
(45) Date of Patent: Jun. 15, 2004

(54) IMAGE PROCESSING APPARATUS

(75) Inventors: Toshihiro Kanata, Nara (JP); Yasushi Adachi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/502,615

(22) Filed: Feb. 11, 2000

(30) Foreign Application Priority Data

Feb. 12, 1999 (JP) ............................................. 11-034868

(51) Int. Cl.[7] .............................. H04N 1/40; H04N 1/48; G06T 7/00; G06K 9/46
(52) U.S. Cl. ........................ 358/2.1; 358/462; 382/176; 382/205
(58) Field of Search ....................... 358/2.1, 462, 3.24; 382/176, 173, 205, 283

(56) References Cited

U.S. PATENT DOCUMENTS

| | | | | |
|---|---|---|---|---|
| 5,016,118 A | * | 5/1991 | Nannichi | 358/462 |
| 5,331,442 A | | 7/1994 | Sorimachi | |
| 5,546,474 A | * | 8/1996 | Zuniga | 382/176 |
| 5,787,195 A | * | 7/1998 | Tsujimoto et al. | 382/176 |
| 5,911,004 A | * | 6/1999 | Ohuchi et al. | 382/173 |
| 6,111,982 A | * | 8/2000 | Adachi | 382/176 |
| 6,473,202 B1 | * | 10/2002 | Kanata et al. | 358/2.1 |

FOREIGN PATENT DOCUMENTS

| | | |
|---|---|---|
| JP | 3-256178 | 11/1991 |
| JP | 3-276966 | 12/1991 |
| JP | 5-41796 | 2/1993 |
| JP | 7-107275 | 4/1995 |
| JP | 7-273983 | 10/1995 |

OTHER PUBLICATIONS

Please see Office Action from Japanese Patent Office.

* cited by examiner

Primary Examiner—Scott Rogers
(74) Attorney, Agent, or Firm—Edwards & Angell; David G. Conlin

(57) ABSTRACT

The present invention is directed to the provision of an image processing apparatus which enables the characteristic of an image region to be discriminated accurately, even in the presence of pixel displacements, noise, etc. Within masks for three colors, each mask consisting of m×n pixel including an object pixel, sub-region masks of u×v are set, and the sum of pixel densities is calculated by a sum calculation circuit. Based on the thus calculated sum, a parameter calculation circuit calculates a parameter based on which a multi-valued signal generation circuit generates a multi-valued signal. A characteristic signal represented by multi-valued data is generated by a characteristic signal generation circuit from the distribution of data within a region discriminating mask represented by the multi-valued signal, and a segmentation signal representing the result of region characteristic discrimination is output from a segmentation signal generation circuit.

13 Claims, 13 Drawing Sheets

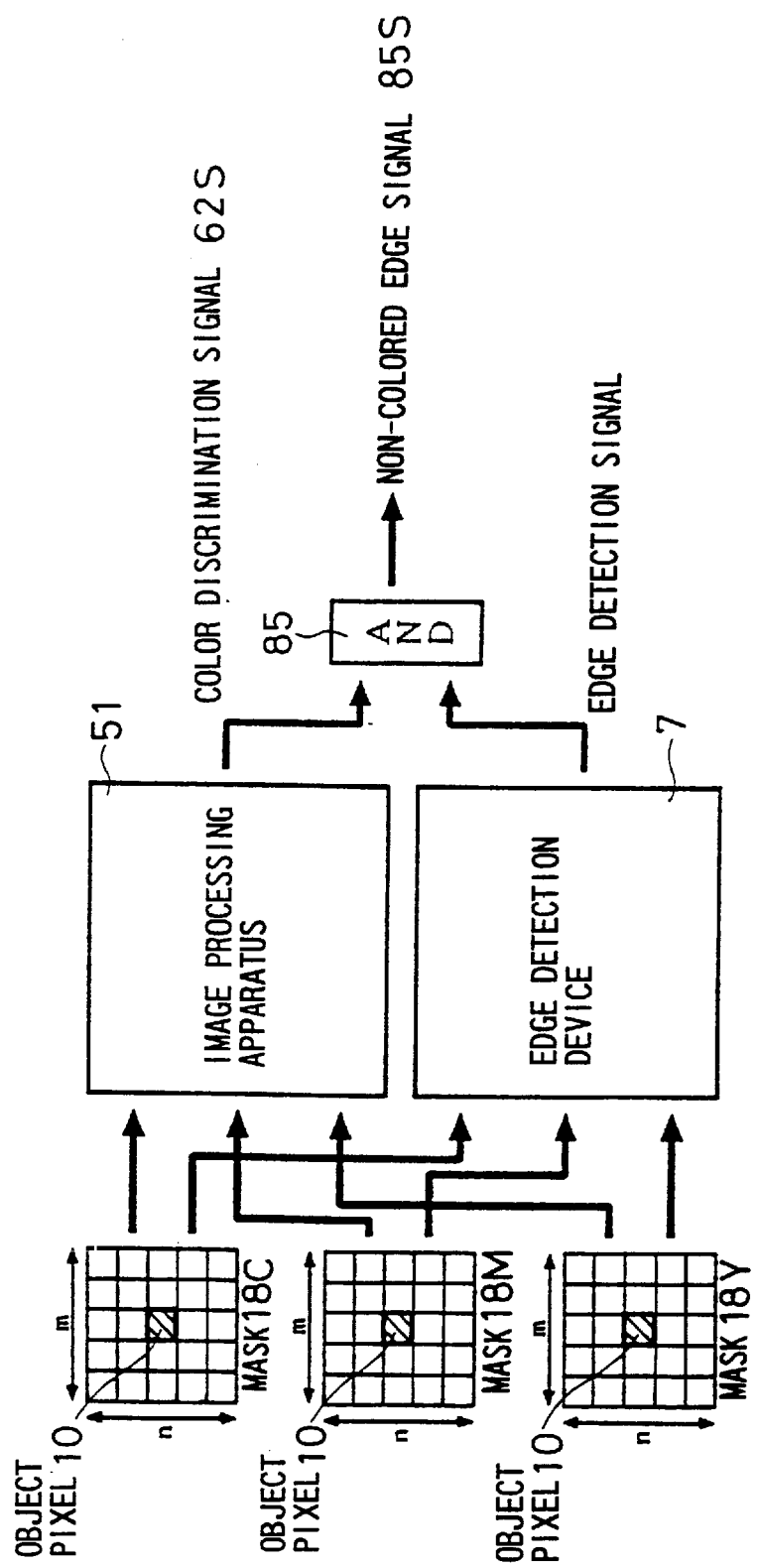

IMAGE PROCESSING APPARATUS

BACKGROUND OF THE INVENTION

1. Field of the Invention

The present invention relates to an image processing apparatus such as a copying machine or a facsimile apparatus, and more particularly to an image processing apparatus which, when processing a color image, can apply to each different kind of image region, an optimum process according to characteristics of the image region.

2. Description of the Related Art

When reproducing color images using a color digital copying machine, color facsimile apparatus or the like, a color discrimination process is performed and, in non-colored image regions is used only black ink or black toner so as to form images of good image quality. In colored image regions are used inks or toners of three primary colors, cyan (C), magenta (M), and yellow (Y) to form color images. Black images could also be formed using all the three primary color inks or toners, but since registration errors tend to occur when overlaying colors one on top of another, causing problems such as colored tinges at black edges. Accordingly in the case of forming characters, the quality of images of characters would degrade. A color discrimination process thus becomes necessary to discriminate between non-colored and colored regions. Furthermore, using only black ink or black toner for non-colored regions has the effect of reducing the amount of use of the inks or toners of the three primary colors.

The color discrimination process is performed using an output from an image reading input apparatus such as a scanner. This kind of input apparatus contains an imaging device such as CCD (charged coupled device) and reads an image as a collection of pixels. In an imaging device such as a CCD, a plurality of light receiving elements are arranged to correspond with pixels. However, because of variations in characteristics such as sensitivity among the plurality of light receiving elements, pixel displacements may occur among inputs corresponding to the respective colors. If such pixel displacements occur, an input condition in which red (R), green (G), and blue (B) are equal in density cannot be obtained; as a result, with a pixel-by-pixel color discrimination process, when an image of a non-colored region is input, the region may often be judged erroneously as being a colored region.

Japanese Unexamined Patent Publication JP-A 5-41796 (1993) discloses a technique for correcting pixel displacements by applying smoothing prior to the color discrimination process. The color discrimination is accomplished by obtaining a maximum value and a minimum value of the density of each color and by comparing the two values to determine through binarization whether the color is achromatic or not. To discriminate a character region, photographic region, halftoned region, etc., a mask region is set and the image density within the mask region is binarized; then, using as an address signal the binarized image density of the pixels contained within the mask, a search is made through a lookup table and data prestored in the lookup table is evaluated as a characteristic value.

If a smoothing process is applied prior to the color discrimination process in order to prevent pixel displacements of RGB inputs, etc. caused by variations within an input apparatus, as practiced in the prior art of JP-A 5-41796, since such a process is not appropriate as a process for correcting pixel displacements, an erroneous discrimination may result. More specifically, a process based only on the maximum and minimum values cannot provide a sufficient number of parameters to achieve accurate color discrimination, and the possibility of erroneously judging a colored region as being a non-colored region or a non-colored region as being a colored region cannot be eliminated. Furthermore, though provisions are made to discriminate character regions, photographic regions, halftoned regions, etc. using a lookup table, it is extraordinary difficult to create a lookup table which can yield good discrimination results, and also, information is not easily obtainable on how the lookup table is to be corrected when there occur many errors in discrimination results. Moreover, when the process is performed using only the smoothing technique, not only pixel displacements but also the differences in color originally present in the original document are all absorbed, and such a process is therefore not effective in color discrimination.

SUMMARY OF THE INVENTION

It is an object of the present invention to provide an image processing apparatus capable of accurately discriminating image region characteristics of an image region of an input to the apparatus, including a discrimination process of characters, photographs or half tone dots and a color discrimination process, regardless of whether the input to the apparatus contains pixel displacements, noise, etc.

The present invention provides an image processing apparatus which carries out a process of discriminating characteristics of a region including an object pixel in order to optimally process an original document which may contain a mixture of different kinds of image regions including characters, photographs and halftone regions, according to characteristics of each image region, comprising:

a mask setting circuit for setting within the region including the object pixel a mask of a predetermined shape so as to contain therein the object pixel;

a sub-region mask generation circuit for generating sub-region masks, each smaller than the mask set by the mask setting circuit, sequentially in different positions within the mask set by the mask setting circuit, to obtain a sum of pixel densities within each of the sub-region masks;

a parameter calculation circuit for calculating a parameter within the mask, using the sum of pixel densities obtained by the sub-region mask generation circuit;

multi-valuing means for performing a multi-valuing process using the parameter calculated by the parameter calculation circuit;

characteristic signal generating means for generating from distribution of multi-valued data generated by the multi-valuing means, within the mask, a characteristic signal represented by the multi-valued data; and region discriminating means for discriminating the characteristics of the region, based on the characteristic signal supplied from the characteristic signal generating means.

According to the invention, for the original document containing a mixture of characters, photographs, halftone dots, etc., the process of discriminating character regions, photograph regions and halftone regions is performed in order to process the document optimally in accordance with the characteristics of the respective image regions. The mask setting circuit sets a mask containing an object pixel. The mask has a predetermined shape, for example, a shape consisting of m×n pixels. The sub-region mask generation circuit generates sub-region masks, each consisting of u×v pixels, wherein m≧u and n≧v, and having a shape smaller than that of the mask set by the mask setting circuit, by sequentially setting the sub-region masks in different positions within the mask, and obtains the sum of pixel densities within each of the sub-region masks. The parameter calculation circuit calculates a parameter within the mask, using the sum of pixel densities obtained by the sub-region mask generation circuit. The multi-valuing means performs the multi-valuing process using the parameter calculated by the parameter calculation circuit. From the distribution of the multi-valued data generated by the multi-valuing means, within the mask, the characteristic signal generating means generates a characteristic signal representing a characteristic amount expressed by the multi-valued data. The region discriminating means discriminates the characteristics of the region, based on the characteristic signal supplied from the characteristic signal generating means. For example, by performing a process of obtaining the sum of pixel densities set by the mask setting circuit within the mask, the characteristics of each image region can be discriminated accurately by reducing the effects of pixel displacements, noise, etc., even when the input signal contains pixel displacements, noise, etc.

As described above, according to the invention, to discriminate the characteristics of the image region containing the object pixel, the mask is set within which a sub-region mask is further set and, while sequentially moving the sub-region mask within the mask, the sum of pixel densities within the sub-region mask is obtained and a parameter is calculated; then, a multi-valuing process is performed and, from the distribution of the multi-valued data, characteristics are obtained and the process of discriminating the characteristics of the region is performed in accordance with the obtained characteristics. Accordingly, the characteristics of the region can be discriminated accurately, even when the input signal contains pixel displacements, noise, etc.

In the invention it is preferable that the multi-valuing means performs the multi-valuing process by combining a plurality of characteristic amounts, based on the sum of pixel densities obtained within the sub-region mask by the sub-region mask generation circuit.

According to the invention, since the multi-valuing means performs the multi-valuing process by combining the plurality of characteristic amounts obtained from the sum of pixel densities within the sub-region mask, the multi-valuing process which matches, for example, characteristics of an input apparatus can be performed, thus making it possible to discriminate the characteristics of each image region in accordance with the input apparatus.

As described above, according to the invention, since the multi-valuing process is performed by combining the several characteristic amounts obtained from the sum of the pixel densities within the sub-region mask, the multi-valuing process which matches the characteristics of an image input apparatus can be performed, thus making it possible to perform an optimum process of discriminating characteristics of each image region in accordance with the input apparatus used.

In the invention it is preferable that the characteristic signal generating means generates the characteristic signal represented by the multi-valued data by combining a plurality of characteristic amounts based on the distribution of the multi-valued data generated by the multi-valuing means for each of the sub-region masks.

According to the invention, since the characteristic signal generating means generates the characteristic signal by combining the plurality of characteristic amounts based on the distribution of the multi-valued data obtained by the multi-valuing process for each of the sub-region masks, the characteristic signal can be generated which matches a post-process, enabling the post-process to be performed in a variety of ways and in suitable fashion.

As described above, according to the invention, since the process of discriminating the characteristics of each image region can be performed in accordance with the combination of the plurality of characteristic amounts obtained from the distribution of the multi-valued data obtained by the multi-valuing process for each of the sub-region masks, the characteristics of the region can be discriminated under conditions optimized for the post-process.

The present invention also provides an image processing apparatus which carries out a process of discriminating characteristics of a region including an object pixel in order to optimally process an original document which may contain a mixture of different kinds of image regions including characters, photographs and halftone regions, according to characteristics of each image region, comprising:

a mask setting circuit for setting within the region including the object pixel a mask of a predetermined shape so as to contain therein the object pixel;

a sub-region mask generation circuit for generating sub-region masks, each smaller than the mask set by the mask setting circuit, sequentially in different positions within the mask set by the mask setting circuit, to obtain a maximum value of pixel densities within each of the sub-region masks;

characteristic amount calculating means for calculating a characteristic amount within the mask, using the maximum value of pixel densities obtained by the sub-region mask generation circuit;

average pixel density calculating means for obtaining an average of pixel densities in the sub-region mask having a smallest density variation of all the sub-region masks generated by the sub-region mask generation circuit;

characteristic signal generating means for generating a characteristic signal associated with the average pixel density using the characteristic amount supplied from the characteristic amount calculating means and the average pixel density supplied from the average pixel density calculating means;

a binarizing circuit for binarizing, based on the average pixel density, each of the sub-region masks generated by the sub-region mask generation circuit; and region discriminating means for discriminating the characteristics of the region whose binarized density is high to consider the characteristic amount represented by the characteristic signal generated by the characteristic signal generating means for the region as a discrimination result for the object pixel.

According to the invention, when processing an original document containing a mixture of characters, photographs, halftone dots, etc., a process of discriminating character, photographic, and halftone regions is performed in order to apply a process optimized to the characteristic of each image region. The mask setting circuit sets a mask of a predetermined shape containing an object pixel and, for example, consisting of m×n pixels. The sub-region mask generation circuit generates sub-region masks each of which is smaller than the mask and consists of u×v pixels, where m≧u and n≧v, by sequentially setting the sub-region mask indifferent positions within the mask, and obtains the maximum value of pixel densities within each of the sub-region masks. The characteristic amount calculating means calculates the characteristic amount using the maximum value of the pixel densities obtained within the mask by the sub-region mask generation circuit. The average pixel density calculating means obtains the average pixel density in the sub-region mask having the smallest density variation of all the sub-region masks generated by the sub-region mask generation circuit. The characteristic signal generating means associates the average pixel density from the average pixel density calculating means with the characteristic amount supplied from the characteristic amount calculating means and generates a characteristic signal representing the characteristic amount associated with the average pixel density.

The region discriminating means discriminates the characteristics of the region the density of which, binarized by the binarizing circuit, is high, to consider the characteristic amount represented by the characteristic signal generated by the characteristic signal generating means for the region as the discrimination result for the object pixel. In this way, if the input signal contains pixel displacements, noise, etc., since the characteristic of the region is discriminated based on the average pixel density of the sub-region mask having the smallest density variation of all the sub-region masks, the characteristic of the region can be discriminated accurately by reducing the effects of pixel displacements, noise, etc.

As described above, since the characteristics of each image region of a document containing a mixture of characters, photographs, halftone dots, etc. are discriminated based on the average pixel density of the region having the smallest pixel density variation in the sub-region mask sequentially moved within the mask so set as to contain the object pixel, good discrimination can be accomplished even when the input signal contains pixel displacements, noise, etc.

In the invention it is preferable that the characteristic signal generated by the characteristic signal generating means is a signal which makes it possible to discriminate the color of the region.

According to the invention, since the color of the region can be discriminated using the characteristic signal generated by the characteristic signal generating means, it becomes possible to vary the base color removal ratio, etc. for each color in the post-process, and the post-process can be performed in a variety of ways and in suitable fashion. As described above, according to the invention, since the characteristics of each image region can be discriminated by discriminating the color of the region, the post-process appropriate to the color can be performed.

In the invention it is preferable that the characteristic signal generated by the characteristic signal generating means is a signal which makes it possible to discriminate a character region.

According to the invention, since a character region can be discriminated using the characteristic signal, it becomes possible to vary, for example, filter coefficients in the post-process, and the post-process can be performed in a variety of ways and in suitable fashion. As described above, according to the invention, since the characteristics of each image region can be discriminated by determining whether the region is a character region or not, an appropriate post-process can be applied to the character region, etc.

In the invention it is preferable that the region discriminating means takes the discrimination result as a discrimination result representing only the object pixel.

According to the invention, since the discrimination result obtained from the region discriminating means is taken as the discrimination result representing only the object pixel, the characteristics can be discriminated on a pixel by pixel basis, and a pixel by pixel detail region discrimination can thus be accomplished. Since a detailed region discrimination result can be obtained in this way, image processing appropriate to the characteristics can be performed on a pixel by pixel basis.

In the invention it is preferable that the region discriminating means takes the discrimination result as a discrimination result for all the pixels within the mask.

According to the invention, since the region discrimination result for the object pixel is applied to all the pixels, including the object pixel, within the mask, there is no need to perform region discrimination on every input pixel.

This achieves higher processing speed and permits reductions in cost.

In the invention it is preferable that the region discriminating means takes the discrimination result as a characteristic discrimination result for a region including neighboring pixels outside the mask.

According to the invention, since the discrimination result for the object pixel is taken as the discrimination result for the pixels in the region larger than the mask, the characteristic of the region can be discriminated quickly, while achieving reductions in cost.

As described above, according to the invention, since the region discrimination result for the object pixel is applied not only to the object pixel but also to other pixels including the pixels outside the mask, there is no need to perform region discrimination on every input pixel. This serves to further increase the processing speed and further reduce the costs.

In the invention it is preferable that the image processing apparatus further comprises an edge detection device for detecting a non-colored edge region using the discrimination result supplied from the region discriminating means.

According to the invention, since the edge detection device detects a non-colored edge region using the discrimination result supplied from the region discriminating means, the image processing apparatus can apply image processing to enhance the edges of non-colored characters, etc. As described above, according to the invention, since non-colored edge regions, etc. can be detected with good accuracy, the edges of black characters, etc. can be enhanced.

In the invention it is preferable that the image processing apparatus further comprises a black generation device for varying an amount of black generation in accordance with the discrimination result supplied from the region discriminating means.

According to the invention, since the black generation device varies the amount of black generation in accordance with the discrimination result supplied from the region discriminating means, the post-process can be performed so that, for a region judged to be a non-colored region, the amount of black generation is increased compared with other regions or only a black ink or black toner is used to produce the output. The provision of the black generation device thus serves to reduce the consumption amount of colored ink for color image formation, thus reducing the total amount of toner or ink used. As described above, according to the invention, since non-colored regions, etc. can be discriminated with good accuracy, the function of the black generation apparatus can be utilized effectively.

In the invention it is preferable that the image processing apparatus further comprises a filter a filter coefficient of which is varied in accordance with the discrimination result supplied from the region discriminating means.

According to the invention, since the filter device varies filter coefficients in accordance with the discrimination result supplied from the region discriminating means, a post-process can be performed so that a crisp black character output can be produced by setting the filter coefficients to provide, for example, an edge enhancing filter for a region judged to be a non-colored edge and a smoothing filter for other regions. As described above, according to the invention, image processing which matches the characteristic of the region can be performed by varying the filter coefficients, etc. of the filter device in accordance with the region discrimination result.

In the invention it is preferable that the image processing apparatus further comprises a halftone generation device a halftone density of which is changed in accordance with the discrimination result supplied from the region discriminating means.

According to the invention, since the halftone processing condition is varied in accordance with the discrimination result supplied from the region discriminating means, the process can be changed, for example, to give priority to resolution for a non-colored region and to gray scale reproduction for other regions. As described above, according to the invention, image processing with proper halftone rendition can be performed by reflecting the region discrimination result in the halftone processing condition of the halftone generation device.

BRIEF DESCRIPTION OF THE DRAWINGS

Other and further objects, features, and advantages of the invention will be more explicit from the following detailed description taken with reference to the drawings wherein:

FIG. 13 is a block diagram showing a configuration for detecting a non-colored edge by combining an edge detection device in the full color copying machine of FIG. 1 with the image processing apparatus shown in FIG. 7.

DETAILED DESCRIPTION OF THE PREFERRED EMBODIMENTS

Figure 1:
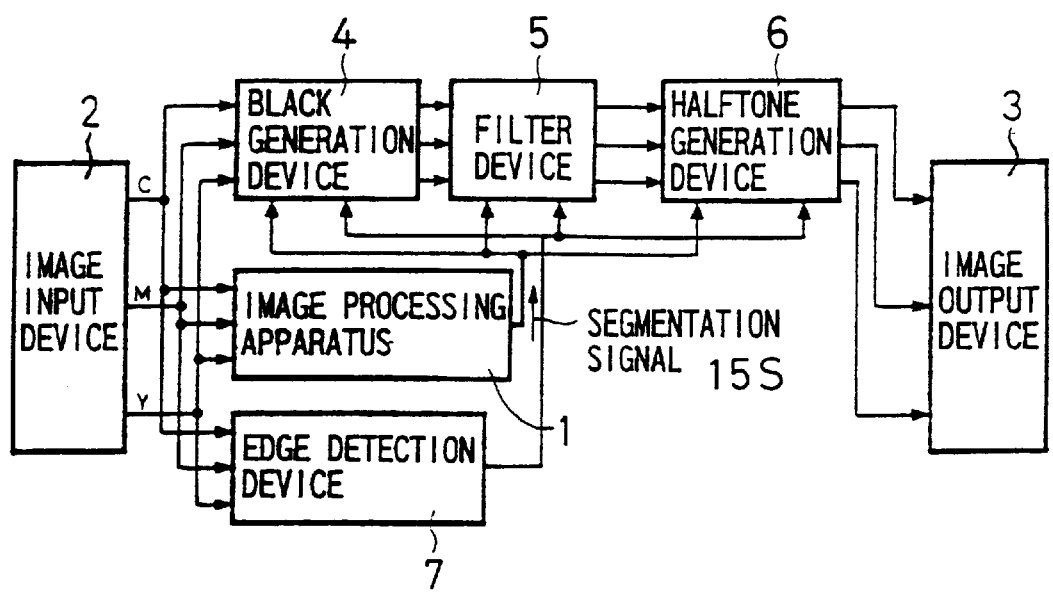
FIG. 1 is a block diagram showing in schematic form the system configuration of a full color copying machine equipped with an image processing apparatus as one embodiment of the invention.

Now referring to the drawings, preferred embodiments of the invention are described below.

Embodiments of the image processing apparatus of the present invention will be described below with reference to FIGS. 1 to 13. Throughout the figures, the same reference numerals designate the same parts, and descriptions of such parts, once given, will not be repeated. The description hereinafter given deals with an example in which the image processing apparatus forms part of a full color copying machine, but it will be appreciated that the invention can be applied not only to a system constructed by combining a plurality of devices as illustrated, but also to an apparatus constructed from a single device. Furthermore, the image processing apparatus of the invention can also be implemented by supplying programs to a general-purpose computer apparatus or system.

FIG. 1 shows in schematic form the system configuration of a full color copying machine equipped with an image processing apparatus as one embodiment of the present invention. The full color copying machine comprises, in addition to the image processing apparatus 1, an image input device 2, an image output device 3, a black generation device 4, a filter device 5, a halftone generation device 6, and an edge detection device 7. An image signal representing a full color image read by scanning an original document is input to the image input device 2. The image signal represents in sequential fashion the density of each of the pixels forming the image by separating the image into color components of cyan (C), magenta (M), and yellow (Y) The image output device 3 produces an output on a copy medium such as paper. As long as one of the black generation device 4, filter device 5, and halftone generation device 6 is provided, the region discrimination result output from the image processing apparatus 1 can be utilized. Further, if the edge detection device 7 is used in combination, the region discrimination result can be output for enhanced image definition, but if the edge detection device 7 is omitted, the region discrimination process itself is unaffected.

Figure 2:
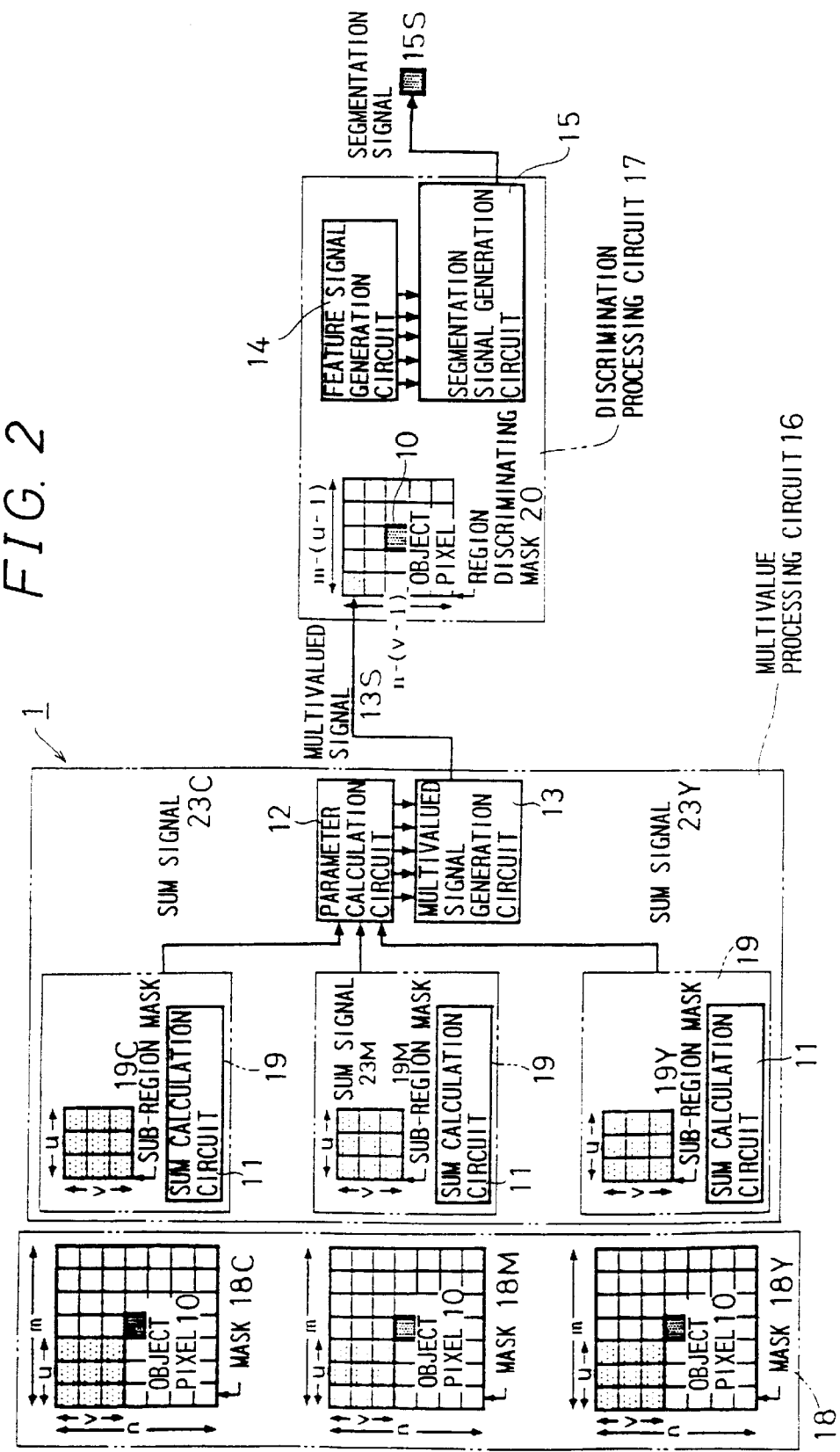
FIG. 2 is a block diagram showing in schematic form the electrical configuration of the image processing apparatus of FIG. 1.

FIG. 2 shows in schematic form the electrical configuration of the image processing apparatus 1 of FIG. 1. The region discrimination process in this embodiment is performed to identify whether a region containing an object pixel 10 in the input image is a non-colored region or not, using sum calculation circuits 11, a parameter calculation circuit 12, a multi-valued signal generation circuit 13 as a multi-valuing means, a characteristic signal generation circuit 14 as a characteristic signal generating means, and a segmentation signal generation circuit 15 as a region discriminating means. The sum calculation circuits 11, the parameter calculation circuit 12, and the multi-valued signal generation circuit 13 together constitute a multi-valuing process circuit 16, while the characteristic signal generation circuit 14 and the segmentation signal generation circuit 15 together constitute a discrimination processing circuit 17. A segmentation signal 15S generated by the segmentation signal generation circuit 15 is supplied to the black generation device 4, filter device 5, and halftone generation device 6 shown in FIG. 1.

As a preparatory step for the discrimination processing circuit 17 to perform the discrimination process on the region containing the object pixel 10, the image region containing the object pixel 10 and consisting of m pixels in the main scanning direction and n pixels in the sub scanning direction (such an image region is hereinafter described simply as "m×n pixels") is set as masks 18C, 18M, and 18Y for respective colors by a mask setting circuit 18. Within the respective masks 18C, 18M, and 18Y, sub-region masks 19C, 19M, and 19Y, of u×v pixels, are set by respective sub-region mask generation circuits 19. Here, m≧u and n≧v, and within the respective masks 18C, 18M, and 18Y, the sub-region masks 19C, 19M, and 19Y can each be set in (m−(u−1))×(n−(v−1)) different positions.

Each sum calculation circuit 11 in the multi-valuing process circuit 16 calculates the sum of pixel densities in the associated sub-region mask, 19C, 19M, or 19Y, set in each different position. Sum signals 23C, 23M, and 23Y representing the calculation results from the respective sum calculation circuits 11 are supplied to the parameter calculation circuit 12. Using the sum signals 23C, 23M, and 23Y, the parameter calculation circuit 12 calculates a number of parameters effective for region discrimination. The multi-valued signal generation circuit 13 generates a multi-valued signal 13s with the necessary number of bits using the parameters obtained from the parameter calculation circuit 12. By sequentially setting the sub-region masks 19C, 19M, and 19Y in the (m−(u−1))×(n−(v−1)) different positions, a region discriminating mask 20 can be obtained from the multi-valued signal 13s in each position. The characteristic signal generation circuit 14 in the discrimination processing circuit 17 generates a number of characteristic signals effective for region discrimination using the region discriminating mask 20. The segmentation signal generation circuit 15 generates the segmentation signal 15S using the characteristic signals obtained from the characteristic signal generation circuit 14.

Figure 3:
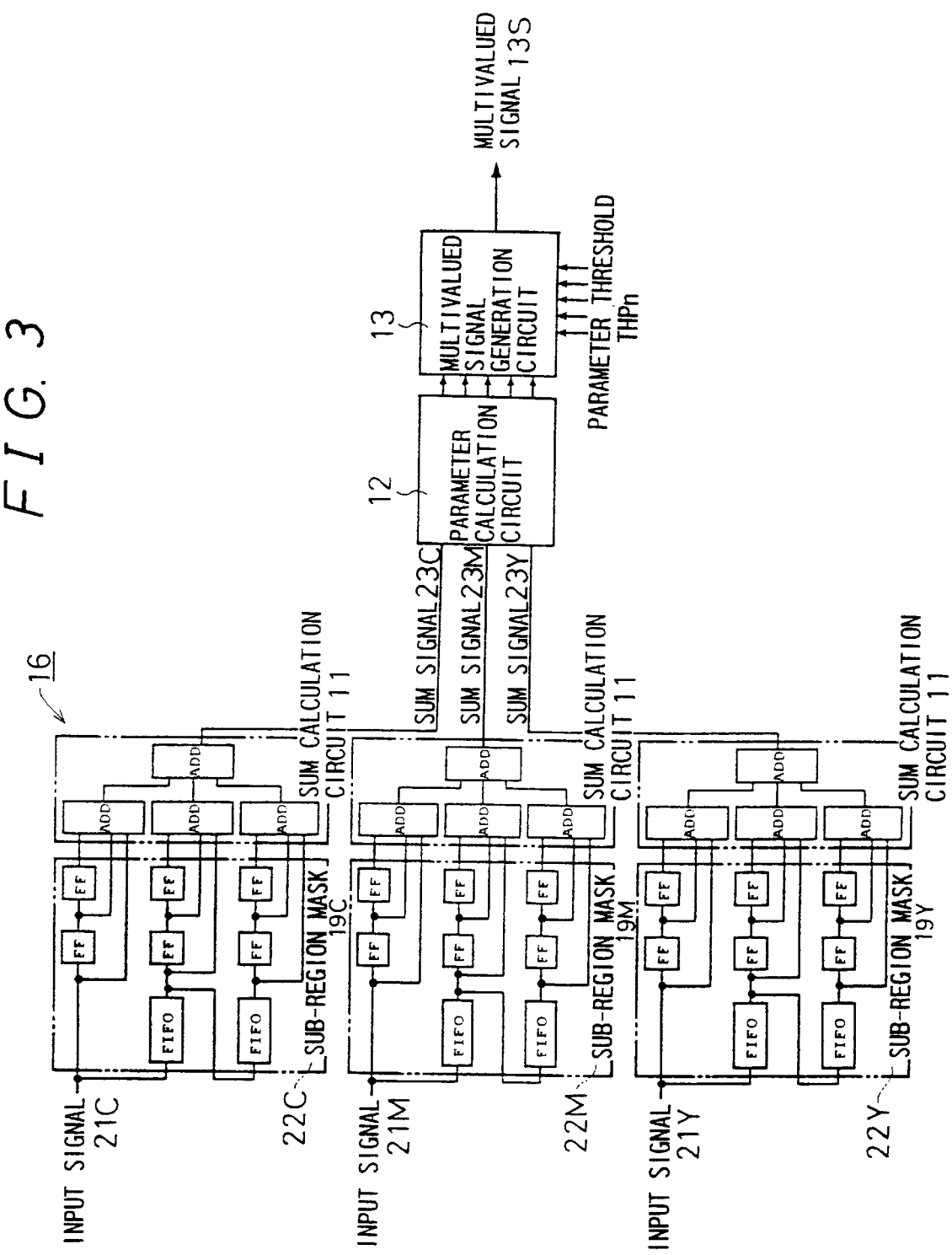
FIG. 3 is a block diagram showing in schematic form the electrical configuration of a multi-valuing process circuit within the image processing apparatus of FIG. 2.

FIG. 3 shows the circuit configuration of the multi-valuing process circuit 16 of FIG. 2. The sub-region mask generation circuits 19 include sub-region mask circuits 22C, 22M, and 22Y, respectively, for forming the respective sub-region masks 19C, 19M, and 19Y accumulating pixel by pixel densities of the respective colors as input signals 21C, 21M, and 21Y. The sub-region mask circuits 22C, 22M, and 22Y each include (u−1)×v flip flops (hereinafter abbreviated as FFs) and v−1 first in first out memories (hereinafter abbreviated as FIFOs). For each of the sub-region masks 19C, 19M, and 19Y each consisting of 3×3 pixels (u=v=3) as shown in FIG. 2, there are provided (3−1)×3=6 FFs and 3−1=2 FIFOs. The density values stored in the FFs and FIFOs within the sub-region mask circuits 22C, 22M, and 22Y are added together by adders (hereinafter abbreviated as ADDs) within the respective sum calculation circuits 11, and the resulting sums are output as the sum signals 23C, 23M, and 23Y for the respective colors.

The parameter calculation circuit 12 calculates parameters effective for region discrimination. Only one kind of parameter may be calculated, but in this embodiment, multiple kinds of parameters PARAm (m is an integer) are calculated as listed below. Max( ), Min( ), and Ave( ) are functions for calculating maximum value, minimum value, and average value, respectively.

Maximum: PARA1=Max(Sum signal 23C, 23M, 23Y)

Minimum: PARA2=Min(Sum signal 23C, 23M, 23Y)

(Maximum−Minimum): PARA3=Max(Sum signal 23C, 23M, 23Y)−Min(Sum signal 23C, 23M, 23Y)

Maximum density difference: PARA4=Max(|Sum signal 23C−Sum signal 23M|, |Sum signal 23M−Sum signal 23Y|, |Sum signal 23Y−Sum signal 23C|)

Minimum density difference: PARA5=Min(|Sum signal 23C−Sum signal 23M|, |Sum signal 23M−Sum signal 23Y|, |Sum signal 23Y−Sum signal 23C|)

(Maximum density difference−Minimum density difference): PARA6=Max(|Sum signal 23C−Sum signal 23M|, |Sum signal 23M−Sum signal 23Y|, |Sum signal 23Y−Sum signal 23C|)−Min(|Sum signal 23C−Sum signal 23M|, |Sum signal 23M−Sum signal 23Y|, |Sum signal 23Y−Sum signal 23C|)

Average: PARA7=Ave(Sum signal 23C, 23M, 23Y)

Figure 4:
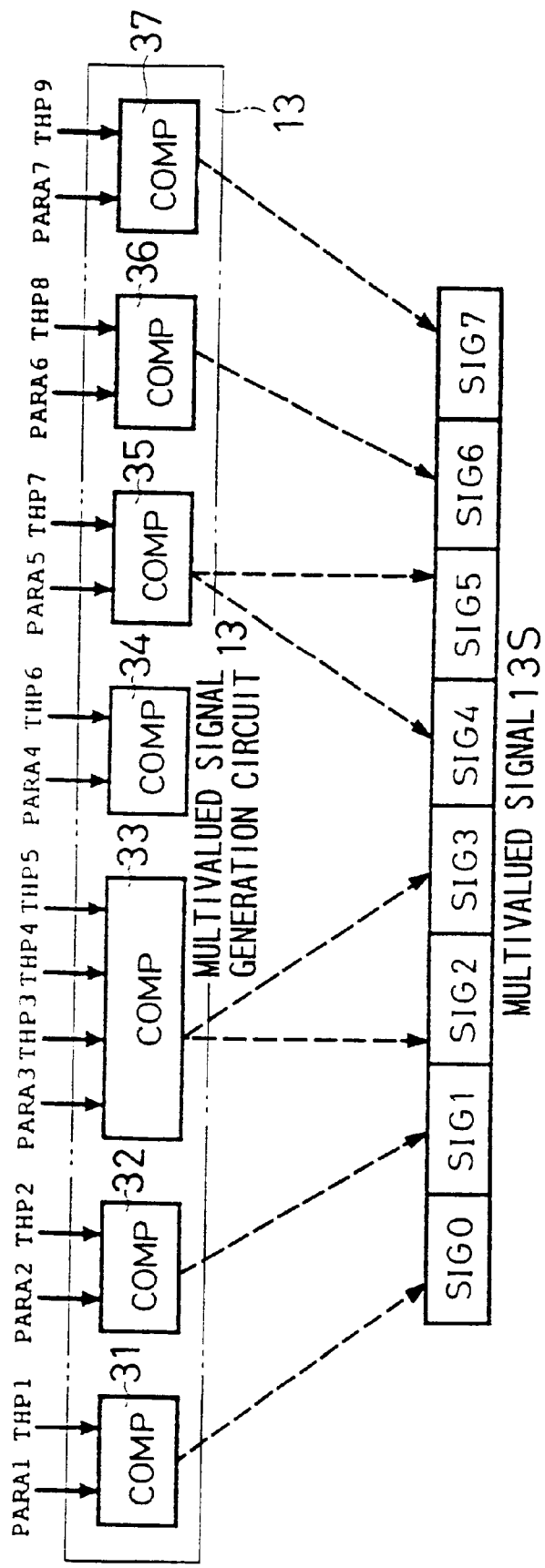
FIG. 4 is a block diagram showing in schematic form the electrical configuration of a multi-valued signal generation circuit within the image processing apparatus of FIG. 2.

FIG. 4 shows the circuit configuration of the multi-valued signal generation circuit 13. The multi-valued signal generation circuit 13 includes a plurality of comparator circuits (hereinafter abbreviated as COMPs) 31 to 37. The COMPs 31 to 37 compare the respective parameters PARAm calculated by the parameter calculation circuit 12 with parameter thresholds (hereinafter abbreviated as THPs) n (n is an integer), and perform the following thresholding to set the respective bits SIGp (p is an integer) in the multi-valued signal 13S for the generation of the multi-valued signal 13S.

COMP 31: When PARA1>THP1, then SIG0=1
Otherwise, SIG0=0

COMP 32: When PARA2>THP2, then SIG1=1
Otherwise, SIG1=0

COMP 33: When PARA3>THP3, then (SIG2, SIG3)=(1, 1)
When THP3≧PARA3>THP4, then (SIG2, SIG3)=(1, 0)
When THP4≧PARA3>THP5, then (SIG2, SIG3)=(0, 1)
When PARA3≦THP5, then (SIG2, SIG3)=(0, 0)

COMP 34: When PARA4>THP6, then SIG4=1
Otherwise, SIG4=0

COMP 35: When PARA5>THP7, then SIG5=1
Otherwise, SIG5=0

COMP 36: When PARA6>THP8, then SIG6=1
Otherwise, SIG6=0

COMP 37: When PARA7>THP8, then SIG7=1
Otherwise, SIG7=0

Figure 5:
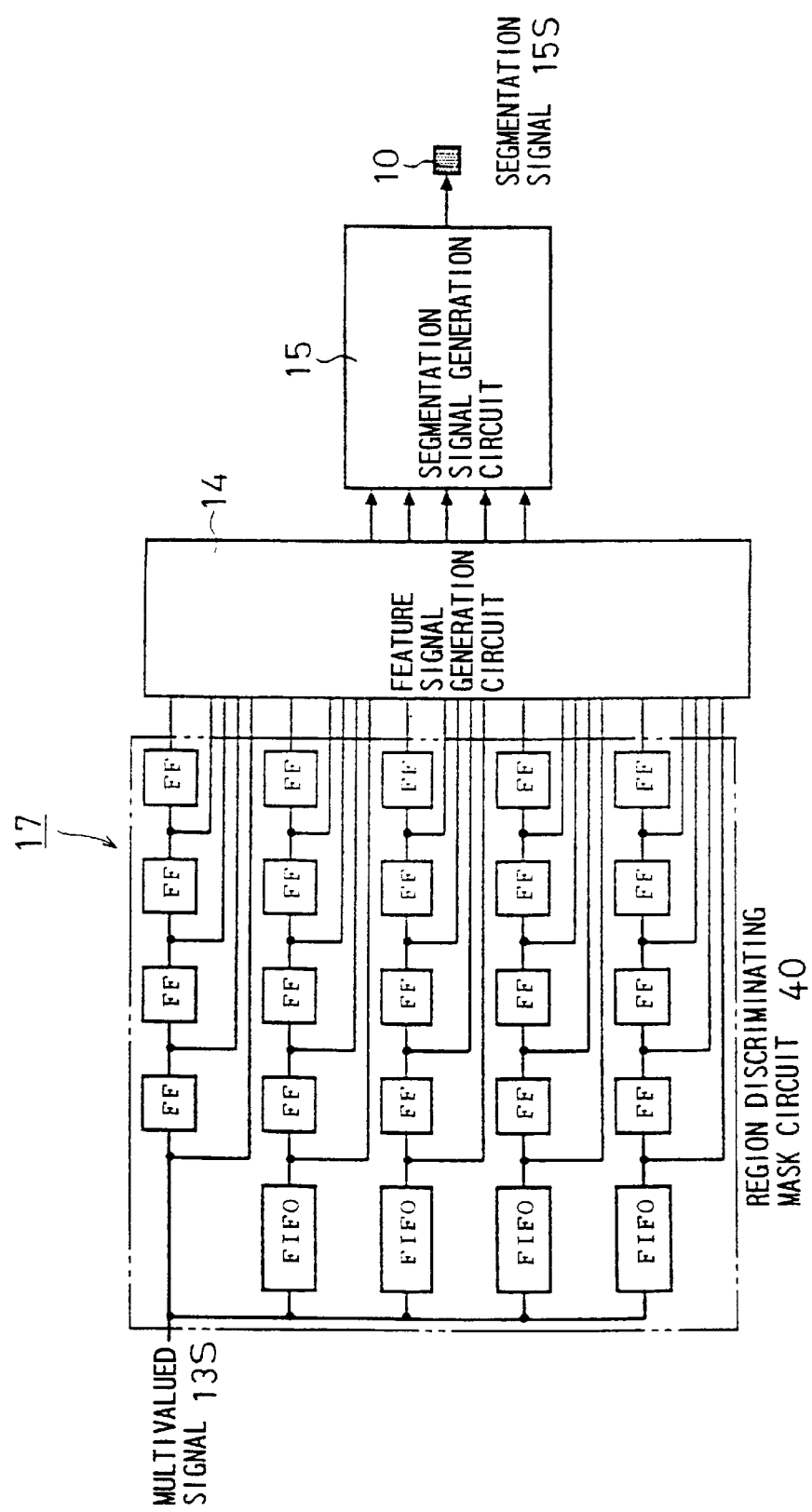
FIG. 5 is a block diagram showing in schematic form the electrical configuration of a discrimination processing circuit within the image processing apparatus of FIG. 2.

FIG. 5 shows the circuit configuration of the discrimination processing circuit 17. The multi-valued signal 13S from the multi-valued signal generation circuit 13 is input to a region discriminating mask circuit 40 for the formation of the region discriminating mask 20. The region discriminating mask circuit 40 includes (m−(v−1)−1)×(n−(v−1)) FFs and (n−(v−1)−1) FIFOs. If u=v=3 and m=n=7, as earlier described, the number of FFs is 4×5=20 and that of FIFOs is 4.

The characteristic signal generation circuit 14 generates characteristic signals using the multi-valued signals accumulated in the region discriminating mask circuit 40. Only one kind of characteristic signal or multiple kinds of characteristic signals may be generated. Feature signals STAq (q is an integer) are generated in the following way so that the color of the region can be recognized to determine whether the region is a non-colored region or not, irrespective of variations in the color signals. Here, (i, j) indicates the position of the multi-valued signal within the region discriminating mask 20.

Since the maximum density difference is small for a non-colored region, the total number of pixels, STA5, within the mask for SIG4=1 is obtained as follows:

Σ(SIG4 (i, j)=1)

Since (maximum density difference–minimum density difference) is small for a non-colored region, the total number of pixels, STA6, within the mask for SIG6=1 is obtained as follows:

Σ(SIG6 (i, j)=1)

Since (maximum–minimum) is small for a non-colored region, the total number of pixels, STA41, within the mask for (SIG2, SIG3)=(1, 1) is obtained as follows:

Σ((SIG2 (i, j), SIG3 (i, j))=(1, 1))

the total number of pixels, STA42, within the mask for (SIG2, SIG3) (1, 0) is obtained as follows:

Σ(SIG2 (i, j), SIG3 (i, j))=(1, 0)

the total number of pixels, STA43, within the mask for (SIG2, SIG3)=(0, 1) is obtained as follows:

Σ((SIG2 (i, j), SIG3 (i, j))=(0, 1)), and the total number of pixels, STA44, within the mask for (SIG2, SIG3)=(0, 0) is obtained as follows:

Σ((SIG2 (i, j), SIG3 (i, j))=(0, 0)

Using the characteristic signals obtained from the characteristic signal generation circuit 14, the segmentation signal generation circuit 15 generates the segmentation signal 15S for output. In the case of a non-colored region, for example, the characteristic signals STA5, STA6, STA41, STA42, STA43, and STA44 are small. These characteristic signals are compared with their associated thresholds THSTA5, THSTA6, THSTA41, THSTA42, THSTA43, and THSTA44, and the segmentation signal 15S is generated as described below.

If (STA5>THSTA5) or (STA6>THSTA6) or (STA41>THSTA41) or (STA42>THSTA42) or (STA43>THSTA43) or (STA44>THSTA44) is satisfied, a colored signal 1 is output as the segmentation signal 15S; otherwise, a non-colored signal 0 is output as the segmentation signal 15S.

It is also possible to discriminate a character region. A character region is distinguished, for example, by the characteristics that a base region exists within the region discriminating mask 20, and that the character density is greater than its threshold, and characteristic signals are generated by the characteristic signal generation circuit 14, for example, as described below.

Since the maximum value is large for a character region, the total number of pixels, STA0, within the mask for SIG0=1 is obtained as follows:

Σ(SIG0 (i, j)=1)

Since a base region exists around a character region, the total number of pixels, STA1, within the mask for SIG1=1 is obtained as follows:

Σ(SIG1 (i, j)=1)

In the case of a character region, since the characteristic signals STA0 and STA1 are large, they are compared with their associated thresholds THSTA0 and THSTA1, and the segmentation signal ISS is output as described below.

If (STA0>THSTA0) and (STA1>THSTA1) are satisfied, a character region signal 1 is output as the segmentation signal 15S; otherwise, a character region signal 0 is output as the segmentation signal 15S.

Figure 6:
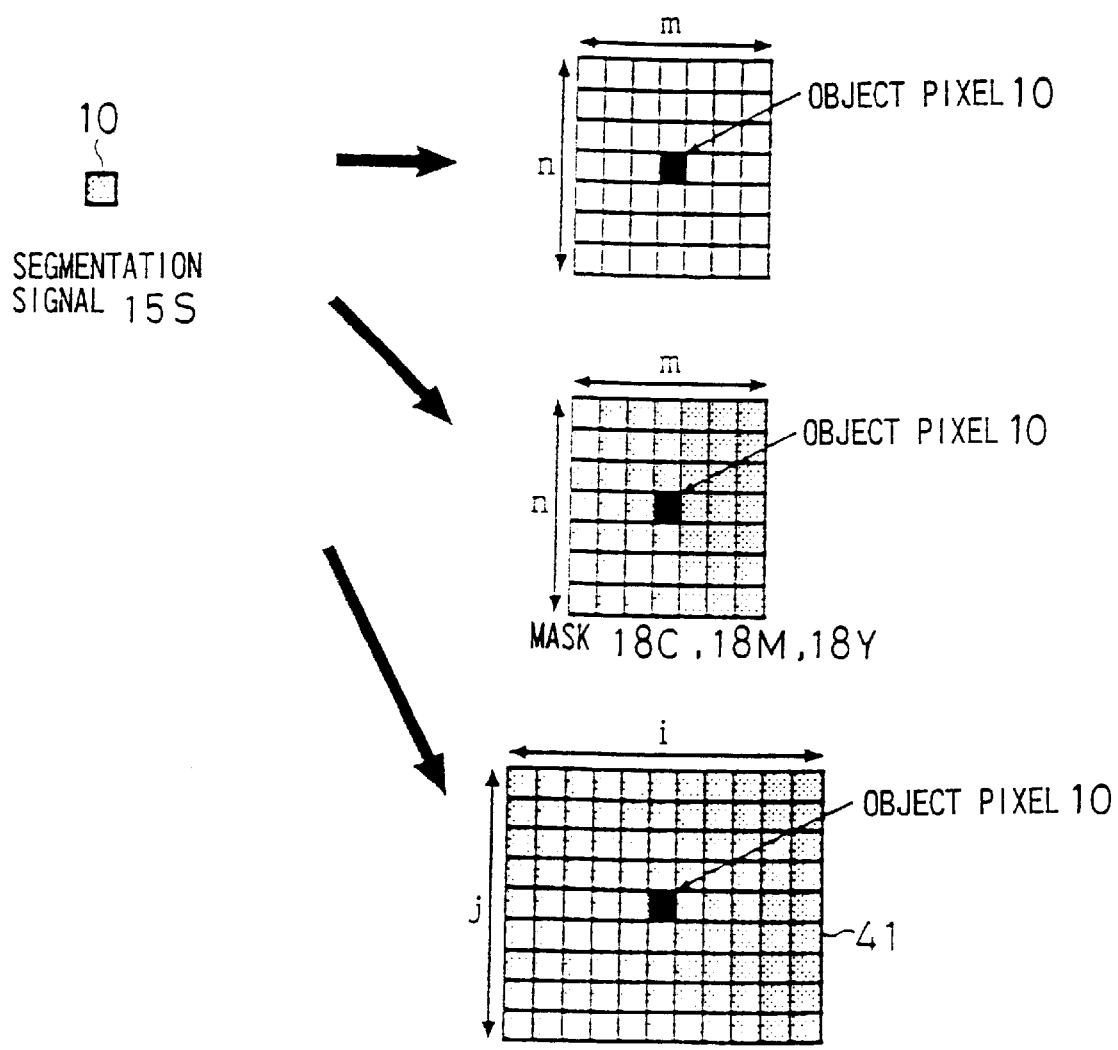
FIG. 6 is a diagram illustrating an outline of ideas how the region discrimination result is reflected using a segmentation signal output from a segmentation signal generation circuit in FIG. 2.

FIG. 6 is a diagram illustrating an outline of ideas how the region discrimination result is reflected using the segmentation signal 15S output from the segmentation signal generation circuit 15. In a first idea, the discrimination result is reflected only in the object pixel 10 by making the segmentation signal 15S represent the result for the object pixel 10. In a second idea, the masks 18C, 18M, and 18Y, containing the object pixel 10, are represented by the segmentation signal 15S so that the discrimination result is reflected in the entire masks 18C, 18M, and 18Y of m×n pixels. In a third idea, the discrimination result can be reflected in an entire region of i×j pixels (i>m, j>n) including neighboring pixels surrounding the masks 18C, 18M, and 18Y containing the object pixel 10.

Figure 7:
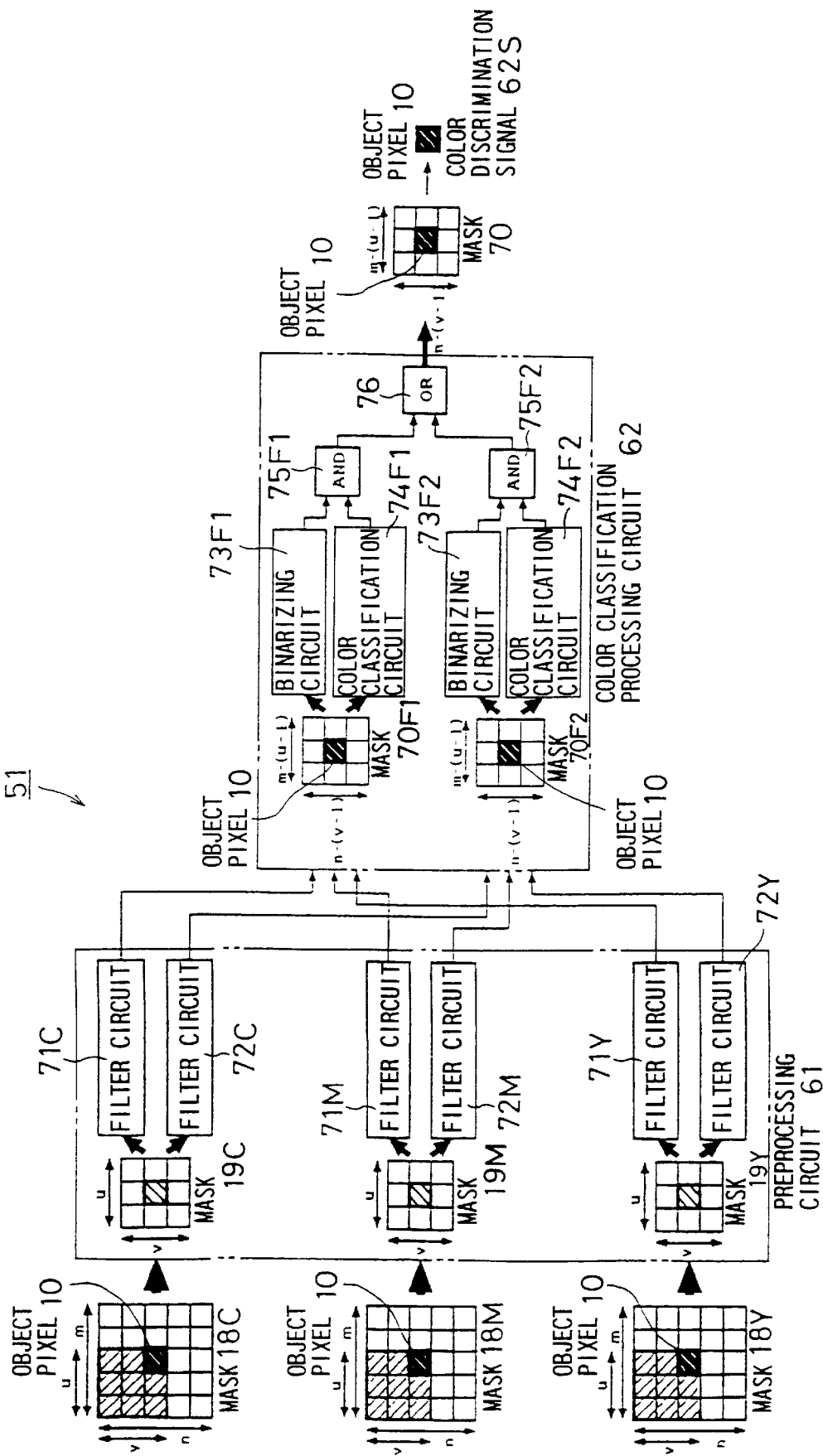
FIG. 7 is a block diagram showing in schematic form the electrical configuration of an image processing apparatus as another embodiment of the present invention.

FIG. 7 shows the electrical configuration of an image processing apparatus 51 as another embodiment of the present invention. In this embodiment, for the colors of the regions containing the object pixel 10 in the input image obtained from an input device such as the image input device 2 of FIG. 1, a preprocessing circuit 61 and a color classification processing circuit 62 perform a necessary process and generate a color classification process result mask 70, based on which a color discrimination signal 62s can be obtained. The description of this embodiment is based on the assumption that m=n=5 and u=v=3.

The preprocessing circuit 61 comprises first filter circuits 71C, 71M, and 71Y and second filter circuits 72C, 72M, and 72Y for performing prescribed filter operations on the respective colors C, M, and Y for the pixel densities of the sub-region masks 19C, 19M, and 19Y of u×v pixels, respectively set within the masks 18C, 18M, and 18Y of m×n pixels including the object pixel 10. The color classification process circuit 62 comprises binarizing circuits 73F1 and 73F2, color classification circuits 74F1 and 74F2, and AND circuits 75F1 and 75F2 for performing prescribed operations on color classification preprocess result masks 70F1 and 70F2 of (mu+1)×(n-v+1) pixels obtained from the signals output from the preprocess circuit 61, and an OR circuit 76. The OR circuit 76 ORs the outputs of the AND circuits 75F1 and 75F2 and generates the color classification process result mask 70.

Figure 8:
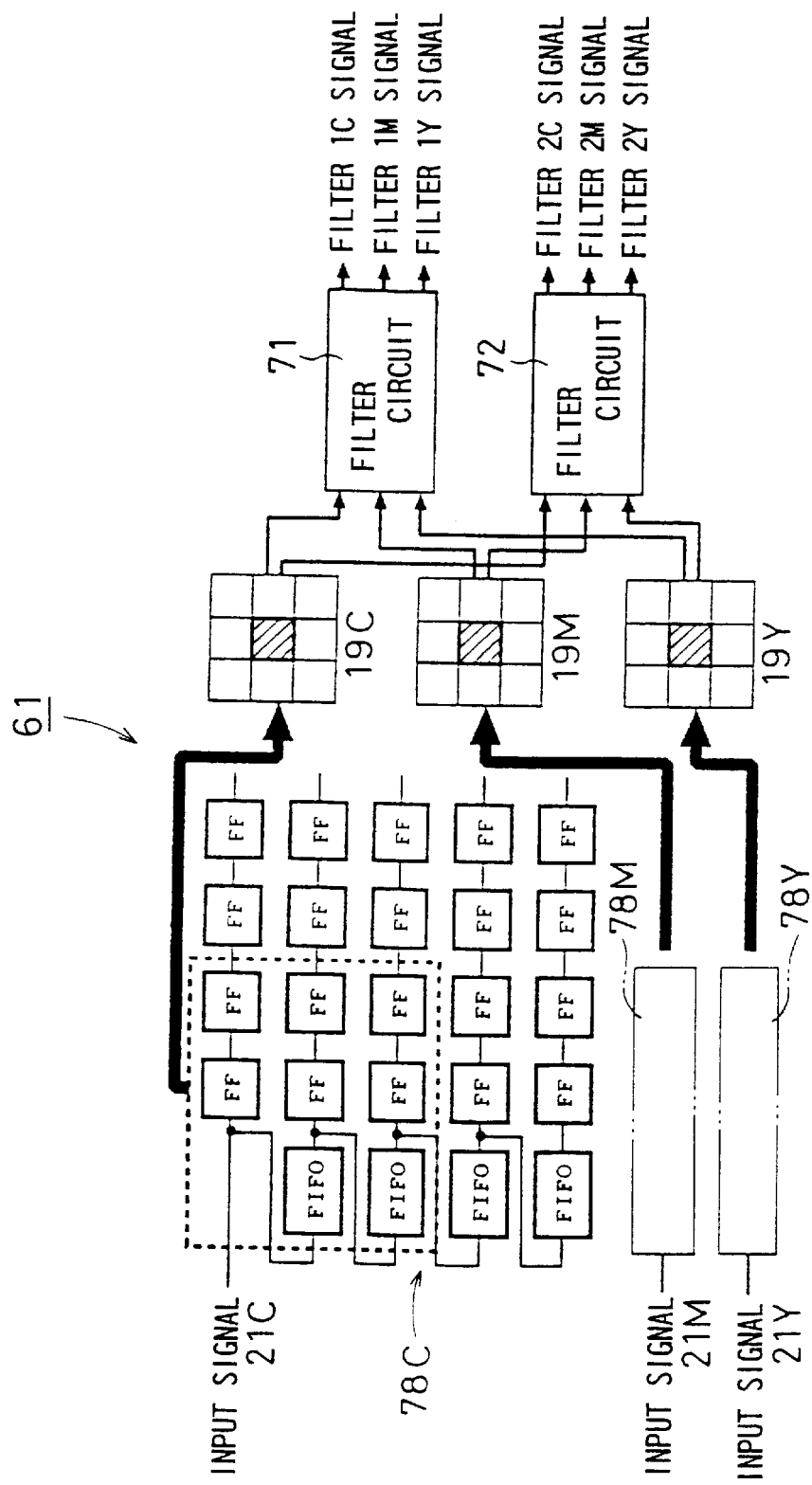
FIG. 8 is a block diagram showing in schematic form the electrical configuration of a preprocessing circuit within the image processing apparatus of FIG. 7.

FIG. 8 shows the circuit configuration of the preprocess circuit 61. Since the masks 18C, 18M, and 18Y each have a mask size of m×n=5×5, i.e., 5×5 pixels, mask circuits 78C, 78M, and 78Y can each be constructed using (m-1)×n=4×5 FFs and m-1=4 FIFOs. Pixel densities represented by the input signals 21C, 21M, and 21Y for the regions containing the object pixel 10 are each stored in one of the FFs or FIFOs in accordance with the position of the corresponding pixel. The sub-region masks 19C, 19M, and 19Y, each having a mask size of u×v=3×3, i.e., 3×3 pixels, can be set in (m-u+1)×(n-v+1)=3×3 different positions within the respective masks 18C, 18M, and 18Y.

Density signals obtained by accumulating the densities of the pixels within the sub-region masks 19C, 19M, and 19Y are passed through the first filter circuit 71 consisting of the first filters 71C, 71M, and 71Y, one for each color, and the second filter circuit 72 consisting of the second filters 72C, 72M, and 72Y, one for each color, and output as a filter 1C signal, filter 1M signal, filter 1Y signal, filter 2C signal, filter 2M signal, and filter 2Y signal, each representing a characteristic amount with eight bits. The filter 1C signal, filter 1M signal, filter 1Y signal, filter 2C signal, filter 2M signal, and filter 2Y signal are generated (m-u+1)×(n-v+1)=3×3 times according to the positions of the sub-region masks 19C, 19M, and 19Y within the respective masks 18C, 18M, and 18Y, and form the first color classification preprocess result mask 70F1 and second color classification preprocess result mask 70F2.

Figure 9:
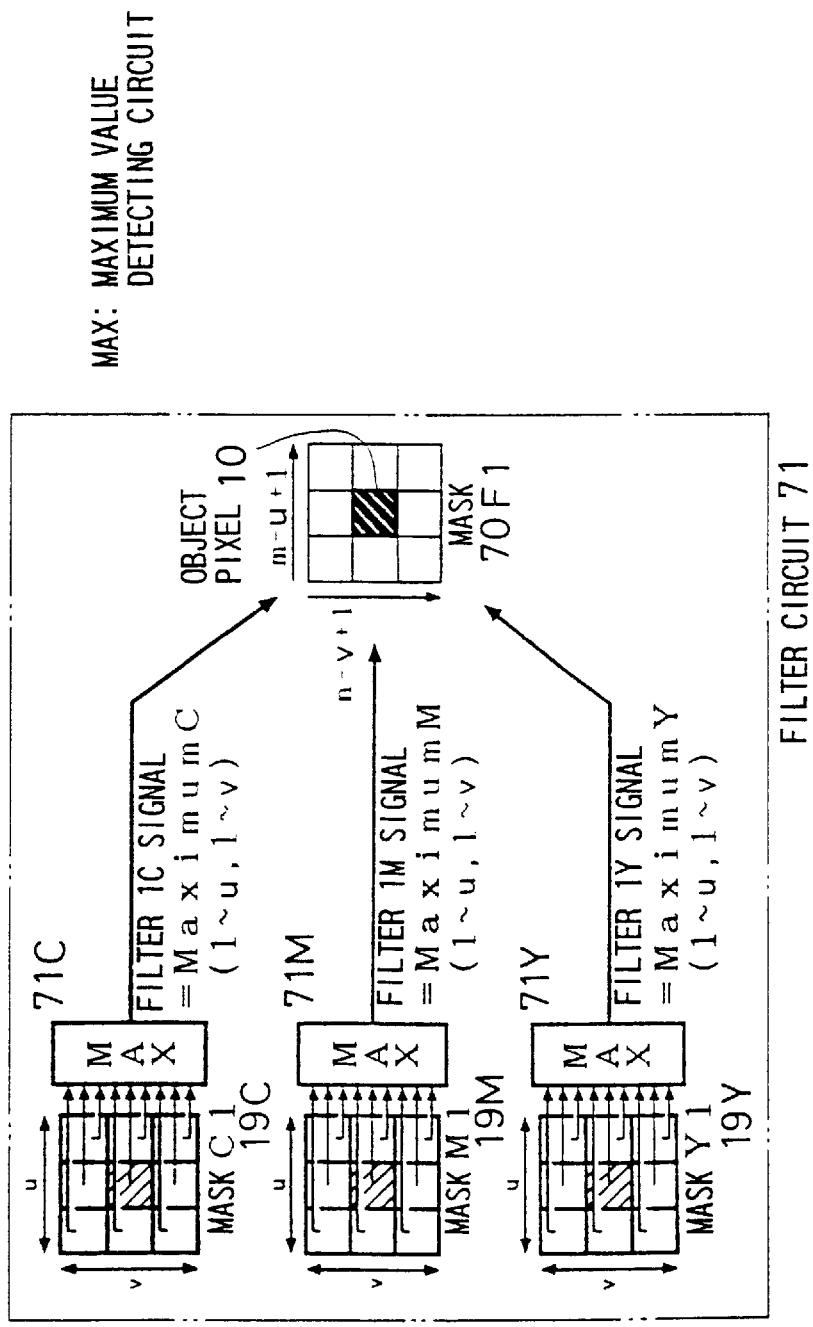
FIG. 9 is a block diagram showing in schematic form the electrical configuration of a first filter circuit within the image processing apparatus of FIG. 7.

FIG. 9 shows the circuit configuration of the first filter circuit 71. The first filter circuits 71C, 71M, and 71Y, one for each color, constituting the first filter circuit 71 are maximum value detection circuits (each abbreviated as MAX in the figure) whose outputs represent the maximum values of the densities of the pixels in the respective sub-region masks 19C, 19M, and 19Y. For the sub-region masks 19C, 19M, and 19Y, each numbering (m−u+1)×(n−v+1)=3×3 the filter 1C signal←the maximum value of the input signal 21C (1 to u, 1 to v)

the filter 1M signal←the maximum value of the input signal 21M (1 to u, 1 to v), and the filter 1Y signal←the maximum value of the input signal 21Y (1 to u, 1 to v)

are obtained to generate the first color classification preprocess result mask 70F1 having a mask size of (m−u+1)×(n−v+1)=3×3. This first filter circuit 71 functions as characteristic amount calculating means for calculating characteristic amounts using the maximum values of the pixel densities of the sub-region masks 19C, 19M, and 19Y within the masks 18C, 18M, and 18Y.

Figure 10:
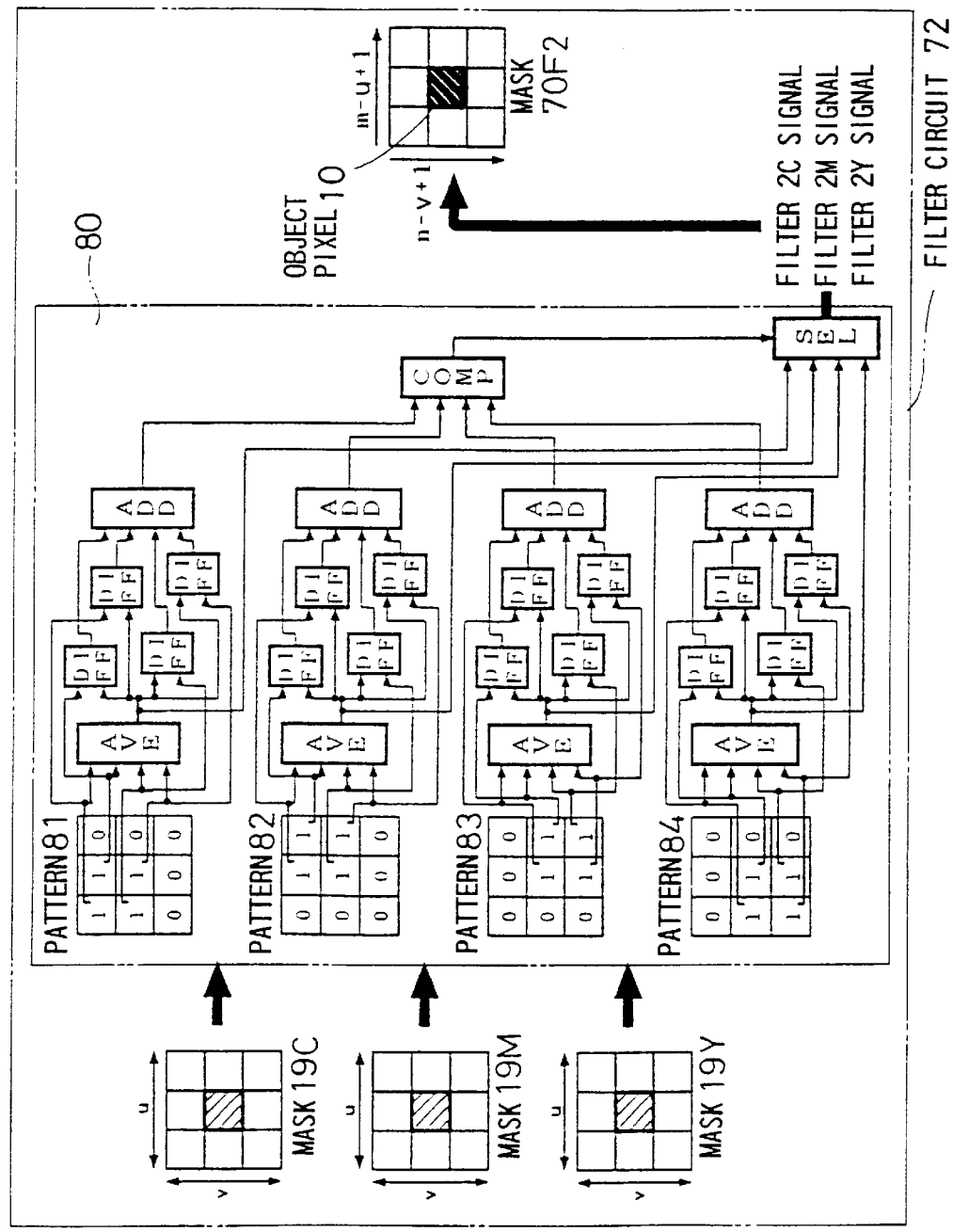
FIG. 10 is a block diagram showing in schematic form the electrical configuration of a second filter circuit within the image processing apparatus of FIG. 7.

FIG. 10 shows the circuit configuration of the second filter circuit 72. The second filter circuits 72C, 72M, and 72Y, one for each color, constituting the second filter circuit 72 include an average/variance computation circuit 80. Within each of the 3×3 pixel sub-region masks 19C, 19M, and 19Y, adjacent 2×2 pixel patterns 81, 82, 83, and 84 can be set in four different positions. The average/variance computation circuit 80 computes the variance of the density values of the pixels within each of the patterns 81, 82, 83, and 84, and outputs the average value of the region where the variance is the smallest. The average/variance computation circuit 80 includes one average value calculation circuit (abbreviated as AVE in the figure), four difference circuits (each abbreviated as DIFF in the figure), and one adder circuit (abbreviated ADD in the figure) for each of the patterns 81, 82, 83, and 84, and further includes one comparator circuit and one selection circuit (abbreviated as SEL in the figure).

The average value calculation circuit calculates the average of the density values of the four pixels contained in the corresponding one of the patterns 81 to 84. The four difference circuits each calculate a variance value representing the difference between the density value of each pixel and its mean. The adder circuit calculates the sum of the four variance values. The comparator circuit compares the sums for the patterns 81 to 84, and determines the pattern for which the sum is the smallest, that is, the density variation is the smallest. The selection circuit selects for output the average value supplied from the average value calculation circuit corresponding to the pattern determined by the comparator circuit. Thus the second filter circuit 72 obtains the filter 2C signal←the average value of the adjacent 2×2 pixel pattern having the smallest density variation in the input signal 21C (1 to u, 1 to v), the filter 2M signal←the average value of the adjacent 2×2 pixel pattern having the smallest density variation in the input signal 21M (1 to u, 1 to v), and the filter 2Y signal←the average value of the adjacent 2×2 pixel pattern having the smallest density variation in the input signal 21Y (1 to u, 1 to v)

and generates the second color classification preprocess result mask 70F2 having a mask size of (m−u+1)×(n−v+1)=3×3. This second filter circuit 72 functions as average pixel density calculation means for obtaining the average pixel density value of the pattern having the smallest density variation in each of the sub-region masks 19C, 19M, and 19Y within the respective masks 18C, 18M, and 18Y.

Figure 11:
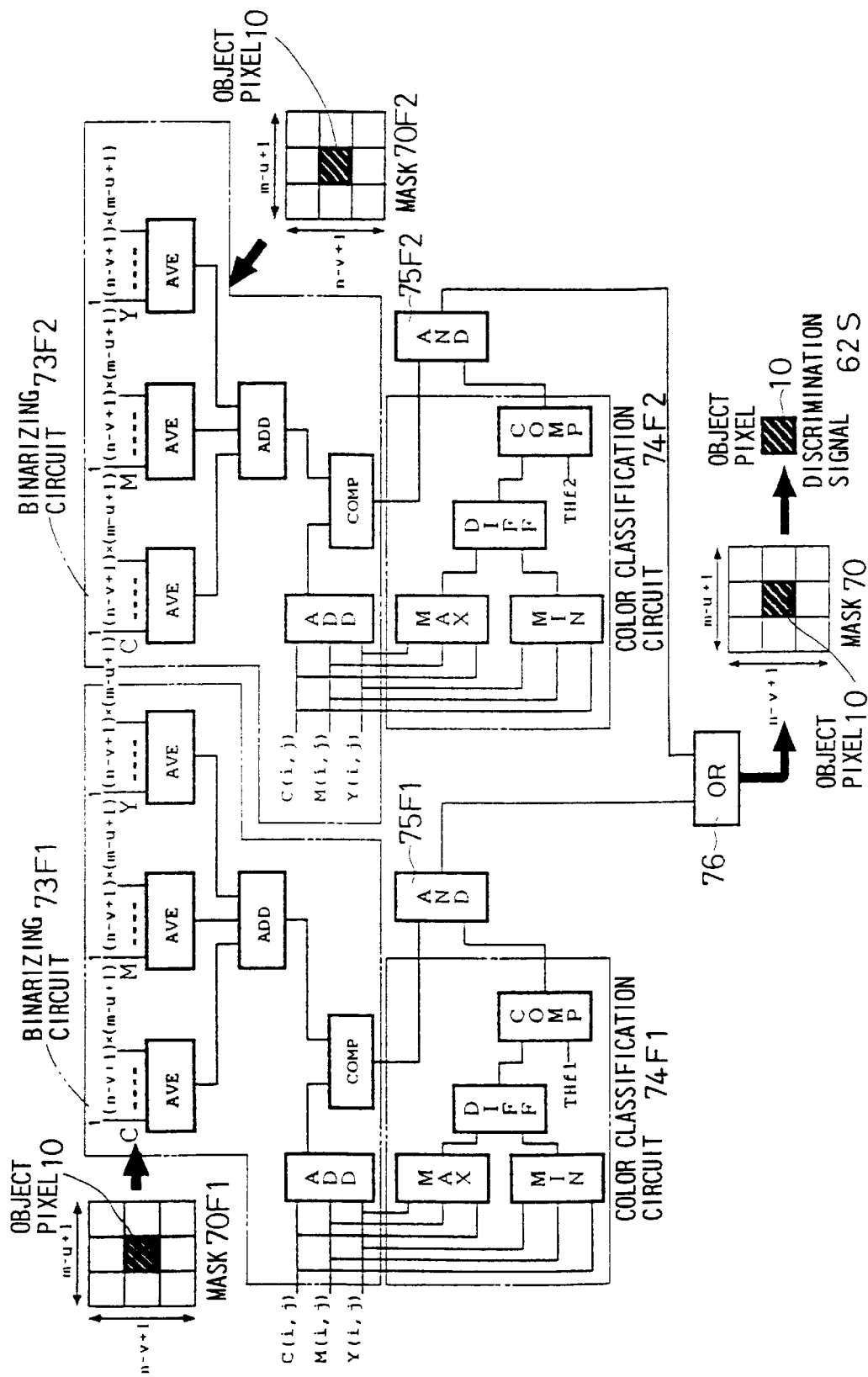
FIG. 11 is a block diagram showing in schematic form the electrical configuration of a color classification processing circuit within the image processing apparatus of FIG. 7.

FIG. 11 shows the circuit configuration of the color classification processing circuit 62. In the first binarizing circuit 73F1, average value calculation circuits calculate average values aveC, aveM, and aveY of the pixel density values for the respective colors C, M, and Y in the first color classification preprocess result mask 70F1. The average values for the respective colors are added together by an adder circuit. Further, density values C(i, j), M(i, j), and Y(i, j) for the respective colors at each pixel (i, j) [i=1 to (m−u+1), j=1 to (n−v+1)] are added together by an adder circuit. The sum of the average values for the respective colors and the sum of the density values for the respective colors are compared in a comparator circuit, and when C(i, j)+M(i, j)+Y(i, j)>aveC+aveM+aveY, a binarization flag for that pixel (i, j) is set to 1. The second binarizing circuit 73F2 performs the same process on the second color classification preprocess result mask 70F2.

The first color classification circuit 74F1 includes a maximum value detection circuit, a minimum value detection circuit (abbreviated as MIN in the figure), a difference circuit, and a comparator circuit. If the condition Max(C(i, j), M(i, j), Y(i, j))−Min(C(i, j), M(i, j), Y(i, j))<THf1(i, j)

is satisfied for the first color classification preprocess result mask 70F1, the comparator circuit sets a color classification flag for that pixel (i, j) [i=1 to (m−u+1), j=1 to (n−v+1)] to 1. Here, Max( ) and Min( ) indicate the functions for calculating the maximum value and minimum value, respectively, and THf1(i, j) is a predetermined threshold value. The second color classification circuit 74F2 performs the same process on the second color classification preprocess result mask 70F2. The first and second color classification circuits 74F1 and 74F2 thus function as characteristic signal generating means for generating color classification flags (characteristic signals) based on the first and second color classification preprocess masks 70F1 and 70F2.

The AND circuits 75F1 and 75F2 and the OR circuit 76 generate the color classification process result mask 70 using the output values from the binarizing circuits 73F1 and 73F2 and color classification circuits 74F1 and 74F2. When the condition binarization flag=1 and color classification flag=1 holds for either one of the color classification preprocess masks 70F1 and 70F2, 70S(i, j) is set to 1, where 70S(i, j) is the component corresponding to an arbitrary pixel (i, j) in the color classification process result mask 70. Otherwise, 70S(i, j) is set to 0.

When the sum of the component values corresponding to the respective pixels in the color classification process result mask 70 is greater than a predetermined threshold value THs, that is, when the condition Σ70S(i, j)>THs is satisfied, the color classification process circuit 62 outputs a 1 as the color discrimination signal 62S, indicating a non-colored region; otherwise, a 0 indicating a colored region is output as the color discrimination signal 62S.

Figure 12:
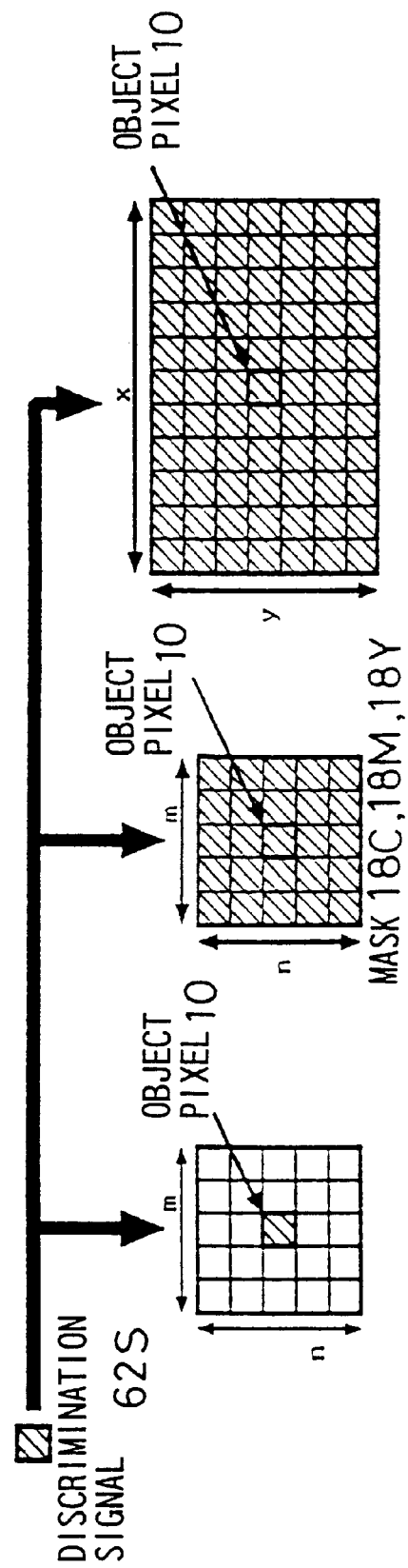
FIG. 12 is a diagram illustrating an outline of ideas how the region discrimination result is reflected using a color classification signal output from the color classification processing circuit in FIG. 7.

FIG. 12 is a diagram illustrating an outline of ideas how the region discrimination result is reflected using the color discrimination signal 62S. Similarly to the case of the segmentation signal 15S shown in FIG. 6, in a first idea, the discrimination result is reflected only in the object pixel 10 by making the color discrimination signal 62S represent the result for the object pixel 10. In a second idea, the masks 18C, 18M, and 18Y, containing the object pixel 10, are represented by the color discrimination signal 62S so that the discrimination result is reflected in the entire masks 18C, 18M, and 18Y of m×n pixels. In a third idea, the discrimination result can be reflected in an entire region of x×y pixels (x>m, y>n) including neighboring pixels surrounding the masks 18C, 18M, and 18Y containing the object pixel 10. In this way, the color classification processing circuit 62 which outputs the color discrimination signal 62S functions as region discriminating means.

FIG. 13 shows a configuration for detecting a non-colored edge by combining the edge detection device 7 shown in FIG. 1 with the image processing apparatus 51 of the present embodiment shown in FIG. 7. The edge detection device 7 is constructed using a Sobel filter or the like, and has a conventional configuration for image edge detection. When the color discrimination signal 62s obtained from the image processing apparatus 51 is set to 1 indicating a non-colored region, and the edge detection signal obtained from the edge detection device 7 is also set to 1 indicating the presence of an edge, an AND circuit 85 outputs a value of 1 to set a non-colored edge signal 85S true.

When the image processing apparatus 1 of FIG. 1 is replaced by the image processing apparatus 51 of the present embodiment shown in FIG. 7, the black generation device 4 adjusts or varies the amount of black generation in accordance with the color discrimination signal 62S. When the color discrimination signal 62S is a 1 indicating a non-colored region, the black generation device 4 performs post-process so that for the region where the discrimination result is reflected as shown in FIG. 12, the amount of block generation is increased compared with other regions or only black toner is used to produce the output. This serves to reduce the amount of use of color toners, reducing the total amount of toners used.

The filter device 5 adjusts or varies filter coefficients in accordance with the color discrimination signal 62S. When the color discrimination signal 62S is set to 1 indicating a non-colored region, and when the edge detection device 7 detects an edge and the non-colored edge signal 85S shown in FIG. 13 is set to 1, the filter device 5 performs post-process, for example, using an edge enhancing filter for the region where the discrimination result is reflected as shown in FIG. 12, and a smoothing filter for other regions. By so doing, the definition of black characters, for example, can be enhanced and crisp black characters can be obtained.

The halftone generation device 6 adjusts or varies halftones to be generated, in accordance with the color discrimination signal 62S. When the color discrimination signal 62S is set to 1 indicating a non-colored region, such a process is performed as dithering with a 2×2 mask for the region where the discrimination result is reflected as shown in FIG. 12, and dithering with a 3×3 mask for other regions. In this way, the process can be switched between a non-colored region, where the process is performed by giving priority to resolution, and other regions, where the process is performed by giving priority to gray scale reproduction. Further, the detection result from the edge detection device 7 can also be reflected simultaneously, as shown in FIG. 12.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image processing apparatus which carries out a process of discriminating characteristics of a region including an object pixel in order to optimally process an original document which may contain a mixture of different kinds of image regions including characters, photographs and halftone regions, according to characteristics of each image region, comprising:

a mask setting circuit for setting within the region including the object pixel a mask of a predetermined shape so as to contain therein the object pixel;

a sub-region mask generation circuit for generating sub-region masks, each smaller than the mask set by the mask setting circuit, sequentially in different positions with in the mask set by the mask setting circuit, to obtain a sum of pixel densities within each of the sub-region masks;

a parameter calculation circuit for calculating a parameter within the mask, using the sum of pixel densities obtained by the sub-region mask generation circuit;

multi-valuing means for performing a multi-valuing process using the parameter calculated by the parameter calculation circuit;

characteristic signal generating means for generating from distribution of multi-valued data generated by the multi-valuing means, within the mask, a characteristic signal represented by the multi-valued data; and region discriminating means for discriminating the characteristics of the region, based on the characteristic signal supplied from the characteristic signal generating means.

2. The image processing apparatus of claim 1, wherein the multi-valuing means performs the multi-valuing process by combining a plurality of characteristic amounts, based on the sum of pixel densities obtained within the sub-region mask by the sub-region mask generation circuit.

3. The image processing apparatus of claim 1, wherein the characteristic signal generating means generates the characteristic signal represented by the multi-valued data by combining a plurality of characteristic amounts based on the distribution of the multi-valued data generated by the multi-valuing means for each of the sub-region masks.

4. An image processing apparatus which carries out a process of discriminating characteristics of a region including an object pixel in order to optimally process an original document which may contain a mixture of different kinds of image regions including characters, photographs and halftone regions, according to characteristics of each image region, comprising:

a mask setting circuit for setting within the region including the object pixel a mask of a predetermined shape so as to contain therein the object pixel;

a sub-region mask generation circuit for generating sub-region masks, each smaller than the mask set by the mask setting circuit, sequentially in different positions within the mask set by the mask setting circuit, to obtain a maximum value of pixel densities within each of the sub-region masks;

characteristic amount calculating means for calculating a characteristic amount within the mask, using the maximum value of pixel densities obtained by the sub-region mask generation circuit;

average pixel density calculating means for obtaining an average of pixel densities in the sub-region mask having a smallest density variation of all the sub-region masks generated by the sub-region mask generation circuit;

characteristic signal generating means for generating a characteristic signal associated with the average pixel density using the characteristic amount supplied from the characteristic amount calculating means and the average pixel density supplied from the average pixel density calculating means;

a binarizing circuit for binarizing, based on the average pixel density, each of the sub-region masks generated by the sub-region mask generation circuit; and region discriminating means for discriminating the characteristics of the region whose binarized density is high to consider the characteristic amount represented by the characteristic signal generated by the characteristic signal generating means for the region as a discrimination result for the object pixel.

5. The image processing apparatus of claim 1, wherein the characteristic signal generated by the characteristic signal generating means is a signal which makes it possible to discriminate the color of the region.

6. The image processing apparatus of claim 1, wherein the characteristic signal generated by the characteristic signal generating means is a signal which makes it possible to discriminate a character region.

7. The image processing apparatus of claim 1, wherein the region discriminating means takes the discrimination result as a discrimination result representing only the object pixel.

8. The image processing apparatus of claim 1, wherein the region discriminating means takes the discrimination result as a discrimination result for all the pixels within the mask.

9. The image processing apparatus of claim 1, wherein the region discriminating means takes the discrimination result as a characteristic discrimination result for a region including neighboring pixels outside the mask.

10. The image processing apparatus of claim 1, further comprising:

an edge detection device for detecting a non-colored edge region using the discrimination result supplied from the region discriminating means.

11. The image processing apparatus of claim 1, further comprising;

a black generation device for varying an amount of black generation in accordance with the discrimination result supplied from the region discriminating means.

12. The image processing apparatus of claim 1, further comprising:

a filter a filter coefficient of which is varied in accordance with the discrimination result supplied from the region discriminating means.

13. The image processing apparatus of claim 1, further comprising:

a halftone generation device a halftone density of which is changed in accordance with the discrimination result supplied from the region discriminating means.

* * * * *